(12) United States Patent
Chijiiwa et al.

(10) Patent No.: US 8,361,248 B2
(45) Date of Patent: Jan. 29, 2013

(54) STEEL SUPERIOR IN CTOD PROPERTIES OF WELD HEAT-AFFECTED ZONE AND METHOD OF PRODUCTION OF SAME

(75) Inventors: Rikio Chijiiwa, Kawasaki (JP); Ryuji Uemori, Tokyo (JP); Yoshiyuki Watanabe, Tokyo (JP); Kazuhiro Fukunaga, Tokyo (JP); Akihiko Kojima, Tokyo (JP); Yoshihide Nagai, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 227 days.

(21) Appl. No.: 12/448,582

(22) PCT Filed: Dec. 4, 2008

(86) PCT No.: PCT/JP2008/072461
§ 371 (c)(1), (2), (4) Date: Jun. 24, 2009

(87) PCT Pub. No.: WO2009/072663
PCT Pub. Date: Jun. 11, 2009

(65) Prior Publication Data
US 2010/0008815 A1 Jan. 14, 2010

(30) Foreign Application Priority Data

Dec. 7, 2007 (JP) ................................. 2007-317317
Dec. 1, 2008 (JP) ................................. 2008-306336

(51) Int. Cl.
C22C 38/00 (2006.01)
C22C 38/08 (2006.01)
C22C 38/16 (2006.01)
C22C 38/04 (2006.01)
C22C 38/14 (2006.01)
C22C 38/12 (2006.01)

(52) U.S. Cl. .......... 148/332; 148/336; 148/541; 420/89; 420/92; 420/93; 420/119; 420/120; 420/126; 420/127; 420/128

(58) Field of Classification Search .................. 420/89, 420/92, 93, 119, 120, 126–128; 148/332, 148/336, 541; 164/459
See application file for complete search history.

(56) References Cited

U.S. PATENT DOCUMENTS 4,790,885 A 12/1988 Imagumbai et al.
5,985,053 A * 11/1999 Hara et al. .................... 148/335
2003/0116238 A1* 6/2003 Fujita et al. .................... 148/593
2007/0051433 A1 3/2007 Kamo et al.
2011/0268601 A1 11/2011 Watanabe et al.

FOREIGN PATENT DOCUMENTS

| | | |
|---|---|---|
| CA | 2231985 | 9/1998 |
| CA | 2429439 | 11/2003 |
| CA | 2 602 076 | 6/2008 |
| EP | 1 094 126 | 4/2001 |
| EP | 1 143 023 | 10/2001 |
| EP | 1 221 493 | 7/2002 |
| EP | 1 695 785 | 8/2006 |
| EP | 1736562 A1 * | 12/2006 |
| JP | 54-131522 | 10/1979 |
| JP | 62-240747 | 10/1987 |
| JP | 01-159356 | 6/1989 |
| JP | 04-103742 | 4/1992 |
| JP | 07-278653 | 10/1995 |
| JP | 09-157787 | 6/1997 |
| JP | 2000-096139 | 4/2000 |
| JP | 2001-323336 | 11/2001 |
| JP | 2007-2271 | 1/2007 |
| JP | 2008-163446 | 7/2008 |
| JP | 2008-169429 | 7/2008 |
| KR | 2006/0090287 | 6/2005 |
| RU | 2198771 | 2/2003 |
| RU | 2211877 | 9/2003 |
| WO | WO 2001/086013 | 11/2001 |

OTHER PUBLICATIONS

European Search Report dated Jun. 29, 2011 issued in corresponding EP Application No. EP 08 85 6343.
Notice of Allowance dated Mar. 2, 2012, issued in Russian Patent Application No. 2011129331, with an English translation thereof.
Final Office Action dated Jan. 17, 2012 issued in U.S. Appl. No. 13/138,119.

* cited by examiner

*Primary Examiner* — Roy King
*Assistant Examiner* — Caitlin Kiechle
(74) *Attorney, Agent, or Firm* — Kenyon & Kenyon LLP

(57) ABSTRACT

The present invention provides a high strength steel having unprecedentedly superior CTOD (fracture toughness) properties satisfying not only the CTOD properties of the FL zone at −60° C., but also the CTOD properties of the ICHAZ zone in small and medium heat input multilayer welding, etc.; and a method of production of the same. The steel of the present invention is steel superior in CTOD properties of the heat-affected zone containing, by mass %, C: 0.015 to 0.045%, Si: 0.05 to 0.2%, Mn: 1.5 to 2.0%, Cu: 0.25 to 0.5%, Ni: 0.7 to 1.5%, P: 0.008% or less, S: 0.005% or less, Al: 0.004% or less, Ti: 0.005 to 0.015%, Nb: 0.005% or less, O: 0.0015 to 0.0035%, and N: 0.002 to 0.006%, $P_{CTOD}$: 0.065 or less, CeqH: 0.235 or less and the balance consisting of Fe and unavoidable impurities.

8 Claims, 2 Drawing Sheets

STEEL SUPERIOR IN CTOD PROPERTIES OF WELD HEAT-AFFECTED ZONE AND METHOD OF PRODUCTION OF SAME

TECHNICAL FIELD

The present invention relates to steel superior in CTOD properties of the weld heat-affected zone (HAZ) from small heat input welding to medium heat input welding and a method of production of the same, more particularly relates to steel superior in CTOD properties of the heat-affected zone with extremely excellent CTOD properties of the FL zone or ICHAZ zone where the toughness deteriorates the most at the time of small heat input welding to medium heat input welding and a method of production of the same.

BACKGROUND ART

In recent years, steel materials used in harsh usage environments have been demanded. For example, as high strength steel materials suitable for steel structures such as offshore structures or earthquake-resistant buildings used in cold regions such as the Artic, steel materials superior in the indicator of the fracture toughness, that is, the CTOD (Crack Tip Opening Displacement) characteristic, have been demanded. The weld zones are considered to require superior CTOD properties.

The CTOD properties of a weld heat-affected zone (HAZ) are evaluated at positions (notches) of two locations of the FL zone (boundary between WM (weld metal) and weld HAZ (heat-affected zone)) and the ICHAZ zone (Intercritical HAZ: boundary between the HAZ and BM (base material)), but up to now, only the FL zone has been covered.

This is because under conditions of not that harsh a test temperature, if the CTOD properties of the FL zone are satisfied, a sufficient value of the CTOD properties of the ICHAZ zone is obtained, so this was not an issue.

However, under harsh conditions of −60° C. or so, it is learned that cases where a low CTOD value is exhibited in the ICHAZ zone occur with a considerable frequency. Measures against this have been sought.

For example, there is art showing that good CTOD properties are obtained at the harsh test temperature of −60° C. in a small to medium heat input weld joint (for example, Japanese Patent Publication (A) No. 2007-002271). Here, the CTOD properties of the ICHAZ zone are not described.

DISCLOSURE OF THE INVENTION

Therefore, the present invention has as its object the provision of high strength steel having superior CTOD (fracture toughness) properties satisfying not only the −60° C. CTOD properties of the FL zone, but also the CTOD properties of the ICHAZ zone in small to medium heat input multilayer welding etc. and a method of production of the same.

The inventors engaged in in-depth research regarding the improvement of both the CTOD properties of the FL zone and ICHAZ zone of the weld zone deteriorating the most in toughness in small heat input welding to medium heat input welding.

As a result, the inventors discovered that to improve both the CTOD properties of the FL zone and ICHAZ zone, reduction of the nonmetallic inclusions is most important and, for this reason, reduction of the O (oxygen in the steel) is essential, but reduction of the O results in reduction of the intragranular ferrite (IGF), so it becomes necessary to reduce the alloy elements causing deterioration of the CTOD properties of the FL zone and therefore improvement of the CTOD properties of the ICHAZ zone is difficult by just reduction of the oxygen in the steel and reduction of the hardness is effective and thereby completed the present invention.

The gist of the present invention is as follows:

(1) Steel superior in CTOD properties of a heat-affected zone containing, by mass %,
 C: 0.015 to 0.045%,
 Si: 0.05 to 0.2%,
 Mn: 1.5 to 2.0%,
 Cu: 0.25 to 0.5%,
 Ni: 0.7 to 1.5%,
 P: 0.008% or less
 S: 0.005% or less,
 Al: 0.004% or less,
 Ti: 0.005 to 0.015%,
 Nb: 0.005% or less,
 O: 0.0015 to 0.0035%,
 N: 0.002 to 0.006%,
 $P_{CTOD}$: 0.065 or less,
 CeqH: 0.235 or less and
 the balance consisting of Fe and unavoidable impurities, where $$P_{CTOD} = C + \frac{1}{22}Cu + \frac{1}{67}Ni$$

$$CeqH = C + \frac{1}{4.16}Si + \frac{1}{14.9}Mn + \frac{1}{12.9}Cu + \frac{1}{105}Ni + 1.12Nb$$

(2) Steel superior in CTOD properties of a heat-affected zone containing, by mass %,
 C: 0.015 to 0.045%,
 Si: 0.05 to 0.2%,
 Mn: 1.5 to 2.0%,
 Cu: 0.25 to 0.5%,
 Ni: 0.7 to 1.5%,
 P: 0.008% or less
 S: 0.005% or less,
 Al: 0.004% or less,
 Ti: 0.005 to 0.015%,
 Nb: 0.005% or less,
 O: 0.0015 to 0.0035%,
 N: 0.002 to 0.006%,
 V: 0.005 to 0.020%,
 $P_{CTOD}$: 0.065 or less,
 CeqH of 0.235 or less and
 the balance consisting of Fe and unavoidable impurities, where:

$$P_{CTOD} = C + \frac{1}{3}V + \frac{1}{22}Cu + \frac{1}{67}Ni$$

$$CeqH = C + \frac{1}{4.16}Si + \frac{1}{14.9}Mn + \frac{1}{12.9}Cu + \frac{1}{105}Ni + 1.12Nb + \frac{1}{1.82}V$$

(3) A method of production of steel superior in CTOD properties of a heat-affected zone characterized by continuously casting steel to obtain a slab containing, by mass %,
 C: 0.015 to 0.045%,
 Si: 0.05 to 0.2%,
 Mn: 1.5 to 2.0%,
 Cu: 0.25 to 0.5%,
 Ni: 0.7 to 1.5%,
 P: 0.008% or less
 S: 0.005% or less, Al: 0.004% or less,
Ti: 0.005 to 0.015%,
Nb: 0.005% or less,
O: 0.0015 to 0.0035%,
N: 0.002 to 0.006%,
$P_{CTOD}$: 0.065 or less,
CeqH of 0.235 or less and
the balance consisting of Fe and unavoidable impurities,
then reheating the slab to 950 to 1100° C. in temperature, then processing the slab by thermo-mechanical control process wherein:

$$P_{CTOD} = C + \frac{1}{22}Cu + \frac{1}{67}Ni$$

$$CeqH = C + \frac{1}{4.16}Si + \frac{1}{14.9}Mn + \frac{1}{12.9}Cu + \frac{1}{105}Ni + 1.12Nb$$

(4) A method of production of steel superior in CTOD properties of a heat-affected zone characterized by continuously casting steel to obtain a slab containing, by mass %,
C: 0.015 to 0.045%,
Si: 0.05 to 0.2%,
Mn: 1.5 to 2.0%,
Cu: 0.25 to 0.5%,
Ni: 0.7 to 1.5%,
P: 0.008% or less
S: 0.005% or less,
Al: 0.004% or less,
Ti: 0.005 to 0.015%,
Nb: 0.005% or less,
O: 0.0015 to 0.0035%,
N: 0.002 to 0.006%,
V: 0.005 to 0.02%,
$P_{CTOD}$: 0.065 or less,
CeqH: 0.235 or less and
the balance consisting of Fe and unavoidable impurities,
then reheating the slab to 950 to 1100° C. in temperature, then processing the slab by thermo-mechanical control process, wherein:

$$P_{CTOD} = C + \frac{1}{3}V + \frac{1}{22}Cu + \frac{1}{67}Ni$$

$$CeqH = C + \frac{1}{4.16}Si + \frac{1}{14.9}Mn + \frac{1}{12.9}Cu + \frac{1}{105}Ni + 1.12Nb + \frac{1}{1.85}V$$

The steel produced by the present invention exhibits superior toughness with extremely excellent CTOD properties of the FL zone and ICHAZ zone where the toughness deteriorates the most at the time of welding such as small and medium heat input multilayer welding etc. Due to this, it becomes possible to produce a high strength steel material for use in offshore structures, earthquake-resistant buildings, and other harsh environments.

BEST MODE FOR CARRYING OUT THE INVENTION

Below, the present invention will be explained in detail.

According to research of the inventors, to satisfy the CTOD properties of the FL zone and ICHAZ zone at −60° C. of the weld HAZ of small to medium heat input (at plate thickness 50 mm, 1.5 to 6.0 kJ/mm) welding, 1) to satisfy the CTOD properties of the FL zone and improve the CTOD properties of the ICHAZ zone, reduction of the oxide-based nonmetallic inclusions is most important. For this reason, reduction of the O (oxygen in the steel) is essential.

That is, in the prior art, to obtain superior CTOD properties of the FL zone, it was necessary to add a certain extent of O for utilizing oxide-based nonmetallic inclusions such as the Ti oxides using the intragranular ferrite (IGF) as transformation nuclei. In the research of the inventors, it was discovered that to improve the CTOD properties in the FL zone and ICHAZ zone at −60° C., it was necessary to reduce the oxide-based nonmetallic inclusions.

Figure 1:
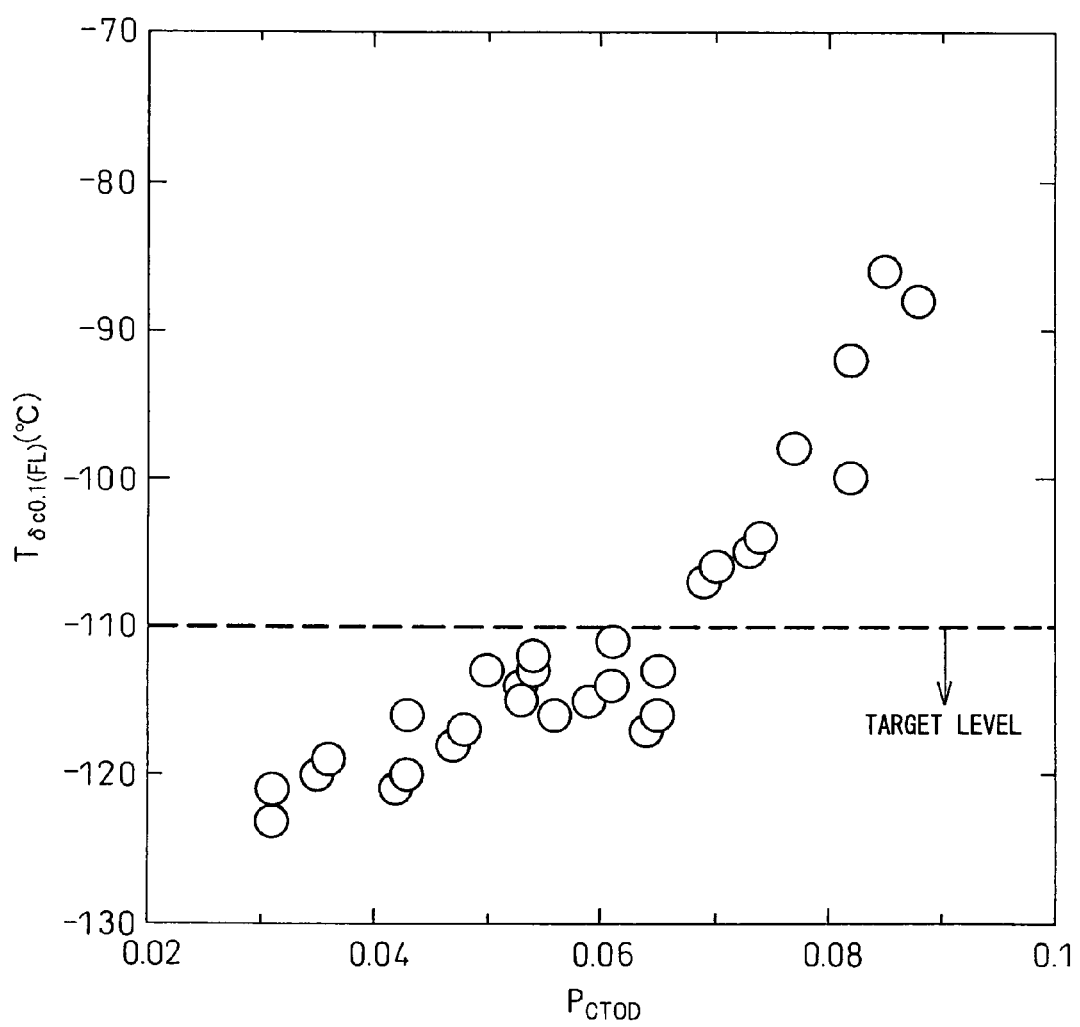
FIG. 1 is a view showing the relationship between the $P_{CTOD}$ and the CTOD properties in an FL equivalent simulated thermal cycle test.

To further reduce the IGF by the reduction of O, reduction of the alloy elements causing deterioration of the CTOD properties of the FL zone is necessary. FIG. 1 shows the relationship between the CTOD properties and $P_{CTOD}$ of the FL equivalent simulated HAZ. Here, the steel ingredient parameter $P_{CTOD}$ is an experimental formula derived from the analysis of the CTOD properties ($T_{\delta c0.1(FL)}$) of the FL equivalent simulated HAZ in a large number of laboratory produced steels and the steel ingredients.

$$P_{CTOD} = C + V/3 + Cu/22 + Ni/67$$

In the FL equivalent simulated HAZ shown in FIG. 1, the target level of $T_{\delta c0.1(FL)} \leq -110°$ C. is a discovery obtained by a large number of experiments. It is the value required for stably obtaining a CTOD value of 0.25 mm or more at −60° C. in an actual joint FL notch of steel plate of a thickness of 50 to 100 mm. From FIG. 1, it is learned that in the FL equivalent simulated HAZ, to make $T_{\delta c0.1(FL)} \leq -110°$ C., it is necessary to control the steel ingredient parameter $P_{CTOD}$ to 0.065% or less.

The $T_{\delta c0.1(FL)}$ of FIG. 1 is obtained by a CTOD test of the BS5762 method (British Standards) of cross-section 10 mm×20 mm test pieces subjected to an FL equivalent simulated thermal cycle treatment (triple cycle) of 1st: 1400° C. (800 to 500° C.: 15 sec), 2nd: 760° C. (760 to 500° C.: 22 sec), and 3rd: 500° C. (500 to 300° C.: 60 sec). Here, $T_{\delta c0.1(FL)}$ means the temperature (° C.) at which the lowest value of the CTOD (δc) values evaluated for the three samples at the different test temperatures exceeds 0.1 mm. Note that, if considering the plate thickness effect in the CTOD test, to stably obtain a CTOD value of 0.25 mm or more at −60° C. at an actual joint FL notch of steel plate of a thickness of 50 to 100 mm, experiments show that it is necessary to make the $T_{\delta c0.1(FL)}$ −110° C. or less.

2) The inventors discovered that improvement of the CTOD properties of the ICHAZ zone is difficult with just reduction of the oxygen in the steel and that reduction of the hardness is effective.

Figure 2:
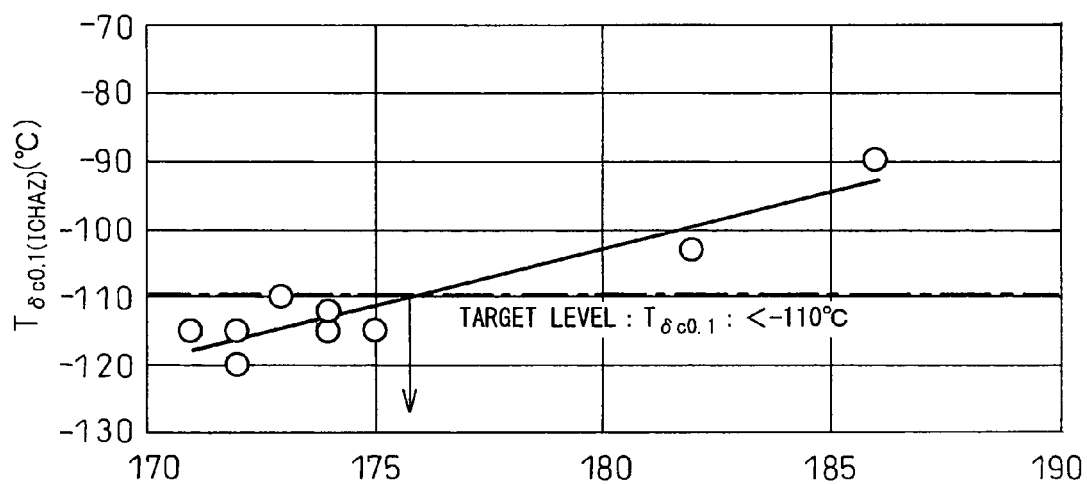
FIG. 2 is a view showing the relationship between the hardness of the HAZ and CTOD properties in an ICHAZ equivalent simulated thermal cycle test.
Figure 3:
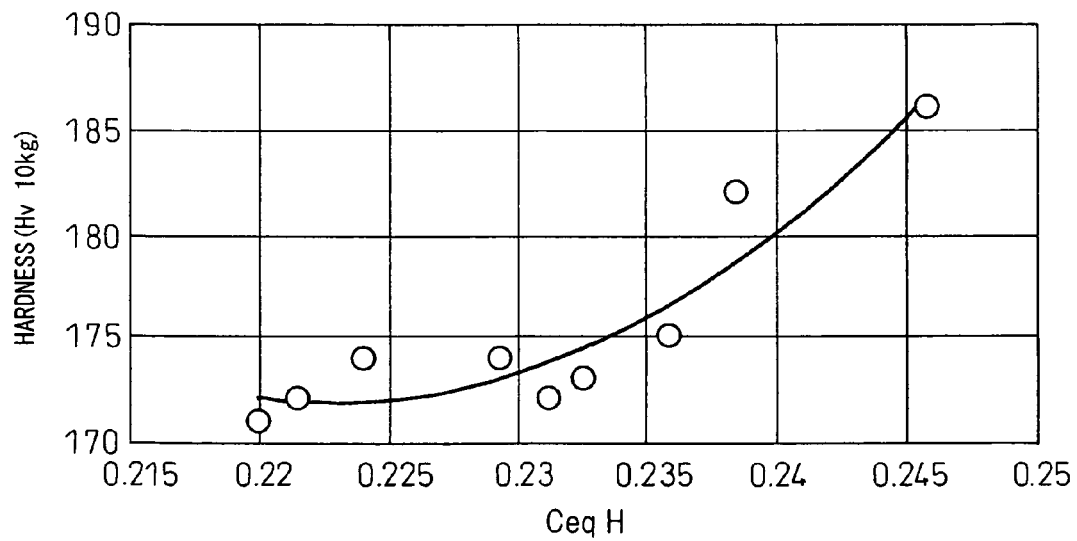
FIG. 3 is a view showing the relationship between the CeqH and hardness of the HAZ in an ICHAZ equivalent simulated thermal cycle test.

FIG. 2 shows the relationship of the CTOD properties and the hardness of the ICHAZ equivalent HAZ of a test piece subjected to a later-mentioned intercritical HAZ (ICHAZ) equivalent simulated thermal cycle, while FIG. 3 shows the relationship of the steel ingredient hardness parameter CeqH and ICHAZ equivalent HAZ hardness.

Here, the target level of a $T_{\delta c0.1(ICHAZ)}$ of the ICHAZ equivalent simulated HAZ shown in FIG. 2 (cross-section 10 mm×20 mm) of −110° C. or less is a discovery obtained by a large number of experiments. This is the value required for obtaining a CTOD value of 0.25 mm or so at −60° C. of an ICHAZ notch of an actual joint of steel plate of a thickness of 50 to 100 mm.

From FIGS. 2 and 3, it is learned that to make the $T_{\delta c0.1(ICHAZ)}$ of the simulated HAZ −110° C. or less, it is necessary to control the hardness to Hv176 or less and the steel ingredient hardness parameter CeqH to 0.235 or less. To further lower the hardness, 0.225 or less is desirable.

Note that, as the test method, the BS5762 method of the CTOD test method (British Standards) is applied. The ICHAZ equivalent simulated thermal cycle conditions (triple cycle) are 1st: PT950° C. (800 to 500° C.: 20 sec), 2nd: 770° C. (770 to 500° C.: 22 sec), and 3rd: 450° C. (450 to 300° C.: 65 sec).

Here, $$CeqH = C + \frac{1}{4.16}Si + \frac{1}{14.9}Mn + \frac{1}{12.9}Cu + \frac{1}{105}Ni + 1.12Nb + \frac{1}{1.82}V$$

is defined.

Even if limiting the amount of $P_{CTOD}$ or CeqH, if not making the other alloy elements suitable, steel provided with both high strength and superior CTOD properties cannot be produced.

Below, the ranges and reasons of limitation of the steel ingredients will be explained. The % described here means mass %.

C: 0.015 to 0.045%,

C has to be 0.015% or more for obtaining strength, but if over 0.045%, the characteristics of the weld HAZ are degraded and the −60° C. CTOD properties cannot be satisfied, so 0.045% was made the upper limit.

Si: 0.05 to 0.2%, preferably 0.15% or less

Si is preferably small so as to obtain a good HAZ toughness, but in the invention steels, Al is not added, so for deoxidation, 0.05% or more is necessary. However, if over 0.2%, the HAZ toughness is degraded, so 0.2% is made the upper limit. To obtain better HAZ toughness, 0.15% or less is desirable.

Mn: 1.5 to 2.0%, preferably 1.8% or less

Mn is an inexpensive element with large effect for obtaining a suitable microstructure and does not harm the HAZ toughness much, so that it is desirable to increase the amount of addition, but if over 2.0%, the hardness of the ICHAZ increases and the toughness is degraded, so 2.0% was made the upper limit. Further, if less than 1.5%, the effect is small, so the lower limit was made 1.5%. To further improve the HAZ toughness, 1.8% or less is desirable.

P: 0.008% or less, preferably 0.005% or less
S: 0.005% or less, preferably 0.003% or less P and S are included as unavoidable impurities. They are both small in amount from the viewpoint of the base material toughness and HAZ toughness, but there are also restrictions in terms of industrial production so 0.008% and 0.005% were made the upper limits. To obtain a better HAZ toughness, P: 0.005% or less and S: 0.003% or less are desirable.

Al: 0.004% or less,

Al causes production of Ti oxides, so preferably is small in amount, but there are restrictions in terms of industrial production so 0.004% is the upper limit.

Ti: 0.005 to 0.015%, preferably 0.013% or less

Ti causes the production of Ti oxides and makes the microstructure finer, but if too large, TiC is produced and the HAZ toughness is degraded, so 0.005 to 0.015% is the suitable range. To further improve the HAZ toughness, 0.013% or less is preferable.

O: 0.0015 to 0.0035%, preferably 0.0030% or less

O has to be contained in 0.0015% or more for the production of oxides of Ti as nuclei for production of IGF at the FL zone. However, if O is too great, the size and number of the oxides become excessive and the CTOD properties of the ICHAZ zone are degraded, so 0.0015 to 0.0035% was made the range of limitation. To obtain a better HAZ toughness, 0.0030% or less, more preferably 0.0028% or less, is preferable.

N: 0.002 to 0.006%, preferably 0.005% or less

N is required for production of Ti nitrides, but if less than 0.002%, the effect is small, while if over 0.006%, at the time of production of steel slabs, surface flaws occur, so the upper limit was made 0.006%. To obtain a better HAZ toughness, 0.005% or less is preferable.

V: 0.005 to 0.02%,

Furthermore, the object of adding V to the basic ingredients is effective for improving the base material strength, but to obtain this effect, 0.005% or more is necessary. On the other hand, if adding over 0.02%, the HAZ toughness is impaired, so as the range not greatly impairing the HAZ toughness, the upper limit of V was made 0.02% or less.

Cu: 0.25 to 0.5%,
Ni: 0.7 to 1.5%, preferably 0.9% or more

Cu and Ni cause little deterioration in the toughness of the HAZ and have the effect of improving the strength of the base material. The increase in the hardness of the ICHAZ also is small. These are expensive alloy elements, so Cu: 0.25 to 0.5% and Ni: 0.7 to 1.5 were made the range of limitation. For Ni, to improve the HAZ toughness, 0.9 to 1.5% is preferable.

Nb: 0.005% or less

Nb is beneficial from the viewpoint of the strength and toughness of the base material, but is harmful to the HAZ toughness. For this reason, it is possible to add up to 0.005% as the limit where the HAZ toughness is not remarkably reduced. However, to improve the HAZ toughness more, it is more preferable to limit this to 0.001% or less.

Even if limiting the ingredients of the steel in the above way, if the method of production is not suitable, the desired effects cannot be exhibited. For this reason, the production conditions also have to be limited.

The invention steels have to be produced industrially by continuous casting.

The reason is that molten steel has a fast solidification and cooling speed and large amounts of fine Ti oxides and Ti nitrides can be formed in the slabs.

At the time of slab rolling, the reheating temperature has to be 950 to 1100° C. If the reheating temperature exceeds 1100° C., the Ti nitrides become coarse and the effect of improvement of the deterioration of toughness of the base material and HAZ toughness cannot be expected.

Further, at the reheating temperature of less than 950° C., the load of the rolling is large and the productivity is inhibited, so 950° C. is the lower limit reheating temperature.

Next, in the method of production after reheating, thermo-mechanical control process is essential. Thermo-mechanical control process is treatment controlling the rolling temperature to a narrow range suitable for steel ingredients, then performing water cooling in accordance with need. Due to this treatment, it is necessary to make the austenite grains finer and make the microstructure finer. Due to this, it is possible improve the strength of the steel material and improve the toughness.

In the invention steels as well, even if superior HAZ toughness is obtained, if the base material is inferior in toughness, the steel material is insufficient, so a method for thermo-mechanical control process is essential.

As methods for thermo-mechanical control process, 1) controlled rolling, 2) controlled rolling-accelerated cooling, ad 3) rolling, then direct quenching-tempering may be mentioned, but the preferable method is controlled rolling-accelerated cooling. Note that even if reheating this steel after production to the temperature of the Ar3 transformation point or less for the purpose of dehydrogenation, the characteristics of the present invention are not harmed.

EXAMPLES

Below, examples and comparative examples will be used to explain the present invention.

Steel plates of various compositions were produced by a process of a converter—continuous casting—plate mill. These were evaluated for strength as the base material and CTOD properties as the weld joint.

The welding was performed by the submerged arc welding (SAW) method generally used as test welding. The weld heat input was 4.5 to 5.0 kJ/mm at a K groove (double-bevel groove) so that the weld fusion line (FL) became vertical.

The CTOD properties were tested on samples of t (thickness)×2t size with notches of 50% fatigue cracks. The notches were made at two positions of the FL (boundary of WM and HAZ) and ICHAZ (boundary of HAZ and BM). Five samples were tested at −60° C.

Table 1 shows the chemical ingredients of the steel, while Table 2 shows the production conditions, base material (BM), and weld joint characteristics.

The abbreviations of the heat treatment methods in Table 2 indicate the following heat treatment methods.

CR: Controlled rolling (rolling in temperature region optimal for strength and toughness)

ACC: Accelerated cooling (water cooling, then gradual cooling until a temperature region of 400° C. to 600° C. in controlled rolling)

DQ: Direct quenching-tempering right after rolling (water cooling until ordinary temperature right after rolling, then tempering)

Further, in the CTOD test results of the weld joint in Table 2, $\delta_{CAV}$ shows the average value for five samples and $\delta_{cmin}$ shows the minimum value among the five samples.

The steel plates produced by the present invention (invention steels) exhibited yield strengths (YS) of 423N/mm$^2$ or more, tensile strengths of 501N/mm$^2$ or more, −60° C. CTOD values of the FL notch δc minimum value (min) of 0.37 mm or more, and ICHAZ notch δc minimum values (min) of 0.53 mm or more for good fracture toughness.

As opposed to this, the comparative steels exhibited strengths equal to the invention steels, but were inferior in CTOD values and are not suitable as steel plates used under harsh environments.

Comparative Steel 16 has a $P_{CTOD}$ value within the limit of invention steels, but has Al and Nb added, so FL notch CTOD value was a low value.

Comparative Steel 17 is too high in C and Mn and also has Nb added, so the $P_{CTOD}$ value and CeqH value are outside the range of limit of the invention steels, so both the FL notch and the ICHAZ notch CTOD values were low values.

Comparative Steel 18 is too low in O and has Nb added as well, so the FL notch CTOD value was a low value.

Comparative Steel 19 has a $P_{CTOD}$ value within the limit of the invention steels, but is too high in Al and also has Nb added, so the FL notch CTOD value was a low value. Further, the CeqH was too high, so the ICHAZ notch CTOD value was also a low value.

Comparative Steel 20 is too low in O, so the FL notch CTOD value was a low value.

TABLE 1

| Class | Steel | C | Si | Mn | Cu | Ni | Nb | V | Al | Ti | P | S | O | N | $P_{CTOD}$ | CeqH |
|---|---|---|---|---|---|---|---|---|---|---|---|---|---|---|---|---|
| Inv. steel | 1 | 0.015 | 0.12 | 1.68 | 0.45 | 1.50 | 0 | 0 | 0.003 | 0.010 | 0.003 | 0.002 | 27 | 44 | 0.058 | 0.206 |
| | 2 | 0.017 | 0.1 | 1.96 | 0.26 | 0.71 | 0 | 0 | 0.003 | 0.009 | 0.005 | 0.003 | 19 | 40 | 0.039 | 0.199 |
| | 3 | 0.020 | 0.1 | 1.65 | 0.42 | 1.47 | 0 | 0 | 0.003 | 0.009 | 0.004 | 0.002 | 19 | 40 | 0.061 | 0.201 |
| | 4 | 0.020 | 0.1 | 1.78 | 0.32 | 0.87 | 0 | 0 | 0.003 | 0.009 | 0.003 | 0.001 | 19 | 40 | 0.047 | 0.197 |
| | 5 | 0.022 | 0.12 | 1.63 | 0.40 | 1.45 | 0 | 0 | 0.003 | 0.011 | 0.004 | 0.002 | 22 | 45 | 0.062 | 0.205 |
| | 6 | 0.024 | 0.1 | 1.64 | 0.42 | 1.32 | 0 | 0 | 0.004 | 0.009 | 0.005 | 0.002 | 26 | 43 | 0.063 | 0.203 |
| | 7 | 0.026 | 0.11 | 1.64 | 0.39 | 1.28 | 0 | 0 | 0.004 | 0.010 | 0.004 | 0.003 | 30 | 36 | 0.063 | 0.205 |
| | 8 | 0.029 | 0.08 | 1.64 | 0.40 | 1.22 | 0 | 0 | 0.004 | 0.008 | 0.003 | 0.001 | 20 | 52 | 0.065 | 0.201 |
| | 9 | 0.030 | 0.09 | 1.63 | 0.38 | 1.18 | 0 | 0 | 0.003 | 0.011 | 0.005 | 0.001 | 24 | 44 | 0.065 | 0.202 |
| | 10 | 0.027 | 0.12 | 1.64 | 0.25 | 1.23 | 0 | 0.02 | 0.003 | 0.011 | 0.005 | 0.002 | 25 | 35 | 0.063 | 0.218 |
| | 11 | 0.032 | 0.13 | 1.61 | 0.33 | 1.18 | 0 | 0 | 0.003 | 0.009 | 0.003 | 0.001 | 31 | 28 | 0.065 | 0.208 |
| | 12 | 0.034 | 0.12 | 1.6 | 0.30 | 1.15 | 0 | 0 | 0.002 | 0.011 | 0.004 | 0.003 | 28 | 31 | 0.065 | 0.204 |
| | 13 | 0.037 | 0.11 | 1.63 | 0.20 | 1.06 | 0 | 0.01 | 0.002 | 0.009 | 0.005 | 0.002 | 32 | 42 | 0.065 | 0.209 |
| | 14 | 0.039 | 0.12 | 1.63 | 0.25 | 0.92 | 0 | 0 | 0.002 | 0.008 | 0.003 | 0.002 | 31 | 47 | 0.064 | 0.205 |
| | 15 | 0.042 | 0.11 | 1.64 | 0.26 | 0.78 | 0.003 | 0 | 0.002 | 0.008 | 0.004 | 0.001 | 26 | 41 | 0.065 | 0.209 |
| Comp. steel | 16 | 0.038 | 0.13 | 1.97 | 0 | 0 | 0.027 | 0 | 0.025 | 0.008 | 0.004 | 0.003 | 25 | 28 | 0.065 | 0.232 |
| | 17 | 0.051 | 0.12 | 2.03 | 0 | 0 | 0.015 | 0.023 | 0.003 | 0.010 | 0.005 | 0.003 | 26 | 25 | 0.074 | 0.246 |
| | 18 | 0.042 | 0.14 | 1.65 | 0.20 | 0.45 | 0.026 | 0 | 0.003 | 0.013 | 0.003 | 0.002 | 12 | 30 | 0.084 | 0.235 |
| | 19 | 0.038 | 0.11 | 2.13 | 0.15 | 0.30 | 0.017 | 0 | 0.026 | 0.009 | 0.004 | 0.002 | 30 | 32 | 0.066 | 0.241 |
| | 20 | 0.028 | 0.13 | 1.64 | 0.45 | 1.63 | 0 | 0 | 0.003 | 0.010 | 0.005 | 0.001 | 10 | 28 | 0.073 | 0.220 |

TABLE 2

| | Steel class | Heating temperature (° C.) | Heat treatment method | t (mm) | Base material (BM) strength | | CTOD test result of weld joint | | | |
|---|---|---|---|---|---|---|---|---|---|---|
| | | | | | YS (N/mm²) | TS (N/mm²) | FL notch | | ICHAZ notch | |
| | | | | | | | δcav (mm) | δcmin (mm) | δcav (mm) | δcmin (mm) |
| Inv. steel | 1 | 1100 | ACC | 50 | 442 | 509 | 0.62 | 0.48 | 0.73 | 0.54 |
| | 2 | 1050 | ACC | 45 | 447 | 513 | 0.76 | 0.58 | 0.91 | 0.76 |
| | 3 | 1050 | CR | 45 | 460 | 533 | 0.80 | 0.61 | 0.86 | 0.72 |
| | 4 | 1100 | ACC | 50 | 442 | 511 | 0.68 | 0.54 | 0.77 | 0.53 |
| | 5 | 1100 | ACC | 50 | 448 | 522 | 0.64 | 0.51 | 0.72 | 0.60 |
| | 6 | 1100 | DQ | 55 | 432 | 502 | 0.81 | 0.65 | 0.90 | 0.77 |
| | 7 | 1050 | DQ | 55 | 433 | 505 | 0.78 | 0.61 | 0.88 | 0.74 |
| | 8 | 1050 | ACC | 50 | 438 | 508 | 0.77 | 0.63 | 0.95 | 0.84 |
| | 9 | 1100 | ACC | 50 | 436 | 508 | 0.82 | 0.58 | 0.93 | 0.86 |
| | 10 | 1050 | DQ | 60 | 426 | 502 | 0.74 | 0.55 | 0.82 | 0.61 |
| | 11 | 1100 | DQ | 60 | 428 | 503 | 0.63 | 0.43 | 0.91 | 0.85 |
| | 12 | 1100 | ACC | 55 | 429 | 505 | 0.65 | 0.45 | 0.93 | 0.88 |
| | 13 | 1050 | ACC | 60 | 423 | 501 | 0.57 | 0.43 | 0.95 | 0.86 |
| | 14 | 1050 | DQ | 55 | 425 | 505 | 0.55 | 0.40 | 0.97 | 0.83 |
| | 15 | 1100 | ACC | 50 | 424 | 512 | 0.52 | 0.37 | 0.84 | 0.68 |
| Comp. steel | 16 | 1150 | ACC | 50 | 412 | 513 | 0.08 | 0.03 | 0.54 | 0.38 |
| | 17 | 1100 | ACC | 60 | 441 | 546 | 0.06 | 0.02 | 0.07 | 0.02 |
| | 18 | 1100 | ACC | 50 | 429 | 521 | 0.07 | 0.03 | 0.82 | 0.66 |
| | 19 | 1150 | ACC | 60 | 443 | 542 | 0.14 | 0.05 | 0.13 | 0.03 |
| | 20 | 1100 | ACC | 50 | 475 | 545 | 0.24 | 0.07 | 0.83 | 0.72 |

The invention claimed is:

1. Steel plate superior in Crack Tip Opening Displacement properties of a heat-affected zone containing, by mass %,
C: 0.015 to 0.045%,
Si: 0.05 to 0.2%,
Mn: 1.5 to 2.0%,
Cu: 0.25 to 0.5%,
Ni: 0.7 to 1.5%,
P: 0.008% or less,
S: 0.005% or less,
Al: 0.004% or less,
Ti: 0.005 to 0.015%,
Nb: 0.001% or less,
O: 0.0015 to 0.0035%,
N: 0.002 to 0.006%,
$P_{CTOD}$: 0.065 or less,
CeqH: 0.235 or less and
a balance of Fe and unavoidable impurities, where $$P_{CTOD} = C + \frac{1}{22}Cu + \frac{1}{67}Ni$$

$$CeqH = C + \frac{1}{4.16}Si + \frac{1}{14.9}Mn + \frac{1}{12.9}Cu + \frac{1}{105}Ni + 1.12Nb.$$

2. Steel plate superior in Crack Tip Opening Displacement properties of a heat-affected zone according to claim 1, wherein Nb is not added.

3. Steel plate superior in Crack Tip Opening Displacement properties of a heat-affected zone containing, by mass %,
C: 0.015 to 0.045%,
Si: 0.05 to 0.2%,
Mn: 1.5 to 2.0%,
Cu: 0.25 to 0.5%,
Ni: 0.7 to 1.5%,
P: 0.008% or less
S: 0.005% or less,
Al: 0.004% or less,
Ti: 0.005 to 0.015%,
Nb: 0.001% or less,
O: 0.0015 to 0.0035%,
N: 0.002 to 0.006%,
$P_{CTOD}$: 0.065 or less,
CeqH of 0.235 or less and
a balance of Fe and unavoidable impurities, where:

$$P_{CTOD} = C + \frac{1}{3}V + \frac{1}{22}Cu + \frac{1}{67}Ni$$

$$CeqH = C + \frac{1}{4.16}Si + \frac{1}{14.9}Mn + \frac{1}{12.9}Cu + \frac{1}{105}Ni + 1.12Nb + \frac{1}{1.82}V.$$

4. Steel plate superior in Crack Tip Opening Displacement properties of a heat-affected zone according to claim 3, wherein Nb is not added.

5. A method of production of steel plate superior in Crack Tip Opening Displacement properties of a heat-affected zone characterized by continuously casting steel to obtain a slab containing, by mass %,
C: 0.015 to 0.045%,
Si: 0.05 to 0.2%,
Mn: 1.5 to 2.0%,
Cu: 0.25 to 0.5%,
Ni: 0.7 to 1.5%,
P: 0.008% or less
S: 0.005% or less,
Al: 0.004% or less,
Ti: 0.005 to 0.015%,
Nb: 0.001% or less,
O: 0.0015 to 0.0035%,
N: 0.002 to 0.006%,
$P_{CTOD}$: 0.065 or less,
CeqH of 0.235 or less and
a balance of Fe and unavoidable impurities,
then reheating the slab to 950 to 1100° C. in temperature, then processing the slab by thermo-mechanical control process wherein:

$$P_{CTOD} = C + \frac{1}{22}Cu + \frac{1}{67}Ni$$

$$CeqH = C + \frac{1}{4.16}Si + \frac{1}{14.9}Mn + \frac{1}{12.9}Cu + \frac{1}{105}Ni + 1.12Nb.$$

6. The method of production of steel plate superior in Crack Tip Opening Displacement properties of a heat-affected zone according to claim 5, wherein Nb is not added to the steel.

7. A method of production of steel plate superior in Crack Tip Opening Displacement properties of a heat-affected zone characterized by continuously casting steel to obtain a slab containing, by mass %,
C: 0.015 to 0.045%,
Si: 0.05 to 0.2%,
Mn: 1.5 to 2.0%,
Cu: 0.25 to 0.5%,
Ni: 0.7 to 1.5%,
P: 0.008% or less
S: 0.005% or less,
Al: 0.004% or less,
Ti: 0.005 to 0.015%,
Nb: 0.001% or less,
O: 0.0015 to 0.0035%,
N: 0.002 to 0.006%,
V: 0.005 to 0.02%,
$P_{CTOD}$: 0.065 or less,
CeqH: 0.235 or less and
a balance of Fe and unavoidable impurities,
then reheating the slab to 950 to 1100° C. in temperature, then processing the slab by thermo-mechanical control process, wherein:

$$P_{CTOD} = C + \frac{1}{3}V + \frac{1}{22}Cu + \frac{1}{67}Ni$$

$$CeqH = C + \frac{1}{4.16}Si + \frac{1}{14.9}Mn + \frac{1}{12.9}Cu + \frac{1}{105}Ni + 1.12Nb + \frac{1}{1.82}V.$$

8. The method of production of steel plate superior in Crack Tip Opening Displacement properties of a heat-affected zone according to claim 7, wherein Nb is not added to the steel.

\* \* \* \* \*

UNITED STATES PATENT AND TRADEMARK OFFICE
CERTIFICATE OF CORRECTION

PATENT NO. : 8,361,248 B2
APPLICATION NO. : 12/448582
DATED : January 29, 2013
INVENTOR(S) : Rikio Chijiiwa et al.

It is certified that error appears in the above-identified patent and that said Letters Patent is hereby corrected as shown below:

In the Specifications
Column 7, line 13, change "ad 3)" to -- and 3) --.

Signed and Sealed this
Seventeenth Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO. : 8,361,248 B2  Page 1 of 1
APPLICATION NO. : 12/448582
DATED : January 29, 2013
INVENTOR(S) : Chijiiwa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 104 days.

Signed and Sealed this

First Day of September, 2015

Michelle K. Lee
*Director of the United States Patent and Trademark Office*